United States Patent [19]

El-Shoubary et al.

[11] Patent Number: 5,520,815
[45] Date of Patent: May 28, 1996

[54] PROCESS FOR REMOVAL OF LEAD AND OIL CONTAMINANTS FROM MACHINING COOLANT SOLUTIONS

[75] Inventors: Youssef El-Shoubary, Clifton Park; Bang M. Kim; Richard A. Mizenko, both of Schenectady, all of N.Y.

[73] Assignee: General Electric Company, Schenectady, N.Y.

[21] Appl. No.: 538,269

[22] Filed: Oct. 3, 1995

[51] Int. Cl.⁶ .................................................. B01D 61/16
[52] U.S. Cl. ........................ 210/638; 210/651; 210/195.2
[58] Field of Search ................................ 210/651, 195.2, 210/257.2, 500.26, 500.25, 638, 639

[56] References Cited

U.S. PATENT DOCUMENTS 4,929,351  5/1990  Sanborn ........................... 210/195.2

OTHER PUBLICATIONS

Rober Noyes, Pollution Prevention Technology Handbook, pp. 25–26, 1993.
R. W. Peters, Y. Ku, "Separation of Heavy Metals and Other Trace Contaminants", AIChE Symposium Series, vol. 81, 1985, pp. 9–27.

Primary Examiner—Frank Spear
Attorney, Agent, or Firm—Noreen C. Johnson; James Magee, Jr.

[57] ABSTRACT

The process for removal of contaminants from coolants involves using an inorganic hydrophilic membrane, such as a ceramic membrane with varying pore sizes, to remove lead particulates, including soluble lead that is converted to insoluble lead precipitates, and oil from machining coolant solutions. The treated coolant with the lead substantially removed is then recycled back to the coolant tank that is used for machining lead alloy parts.

8 Claims, 1 Drawing Sheet

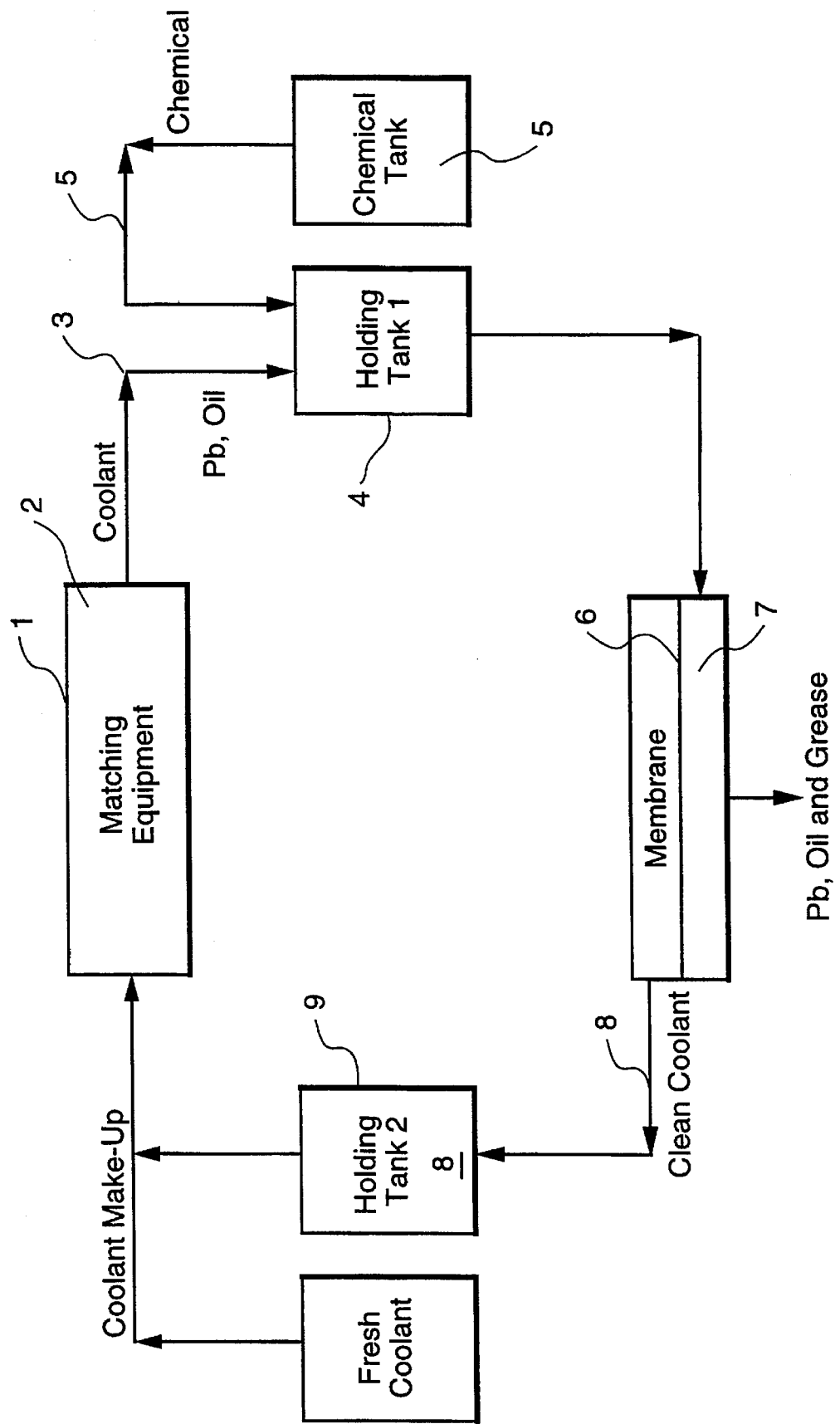

PROCESS FOR REMOVAL OF LEAD AND OIL CONTAMINANTS FROM MACHINING COOLANT SOLUTIONS

FIELD OF THE INVENTION

This invention relates to a process for treating contaminated machining coolant solutions. The invention further relates to a process for contaminant removal from coolant solutions by chemically precipitating dissolved lead and by using membrane filtration to remove lead particulate and oils.

BACKGROUND OF THE INVENTION

Liquid coolant for machining operations is being used in many manufacturing shops. Often, the coolant solution is a synthetic oil dissolved in water. The liquid coolant absorbs the heat generated by the friction which occurs between a carbide tool bit and the metal piece that is being machined. The coolant also serves to remove the metal cuttings (fines) from the surface of the metal piece during machining. If the metal fines are not removed from the machined part, clean, sharp shapes of exact dimensions will not be obtained. Further, the metal piece being machined is generally an alloy. Depending on the composition of the alloy, additional undesirable metal fines or particles can build-up or dissolve in the coolant solution. As a result, the dissolved metal and undissolved metal particles may reach toxic levels in the coolant solution. In addition, cutting oils from the machined parts accumulate in the coolant and should be removed. Thus, the life of any machining coolant depends on the concentrations of metal particulate, soluble metal, and cutting oils. Presently, if any of these concentrations appear excessive to the operator, the coolant is replaced. The spent coolant is collected and disposed of as waste. The coolant waste classification depends on what substances, such as the dissolved and undissolved metal, have contaminated the coolant.

As an example, a machining coolant is used in shaping lead-alloyed parts at a manufacturing plant. Approximately 4000 gallons per month of coolant are being used. The coolant is produced by mixing 5% by weight of synthetic oil with water. The synthetic oil is water soluble. When the coolant comes in contact with the lead alloys, the coolant becomes contaminated with lead. If the lead content of the coolant exceeds 5 ppm, it is considered hazardous waste and must be manifested and disposed of as a hazardous waste. The cost of disposal and the cost of the coolant replacement are high. For instance, about 2000 gallons of coolant are disposed of as hazardous waste every other week at a cost of $0.40/gallon. The cost of transportation of the spent coolant is $800/load. The cost of the fresh replacement coolant is $10/gal. The total cost of disposal is almost $70,000 per year. This cost does not include periodic chemical analysis, which is required for disposal, labor, and waste site storage.

Significant cost savings would result if the coolant solutions are treated to remove hazardous lead metal components and oil so as to regenerate the coolant solution for further use. There is a need for a new low cost and effective treatment process which removes both particulate and dissolved lead and accumulated oil from machining coolant solutions that would dramatically reduce both disposal and replacement cost of the coolant. There is also a need for a process that significantly prolongs the life of the coolant by continuously withdrawing a portion of solution, removing metal contaminants and oil from the solution and recycling the clean treated coolant to the coolant reservoir, thereby regenerating the coolant solution for further use in a manufacturing environment.

SUMMARY OF THE INVENTION

In accordance with this invention, a method is provided for continuous recycling of a machining coolant solution contaminated with soluble lead, lead particulates, and oil comprising the steps of: removing a portion of the machining coolant solution from a machining coolant tank; forming an admixture of an effective amount of monobasic potassium phosphate with the portion of the machining coolant to precipitate a substantial amount of soluble lead from the coolant; passing the admixture through an inorganic hydrophilic membrane to remove lead precipitates, lead particulates and oil; and then recycling the treated coolant back to the machining coolant tank. Basically, the process involves using an inorganic hydrophilic membrane, such as a ceramic membrane with varying pore sizes, to remove lead particulates, including soluble lead that is converted to insoluble lead precipitates, and oil from machining coolant solutions. The treated coolant with the lead substantially removed is then recycled back to the coolant tank that is used for machining the lead alloy parts. The lead particulate, lead precipitates, and oil are collected from the membrane surface and may then be further treated or disposed of according to industry standards. Also, by the removal and collection of the concentrated lead particulates and oil from the membrane surface, the life of the membrane is prolonged and can be reused.

An effective amount of monobasic potassium phosphate ($KH_2PO_4$) means an amount that will react with the dissolved lead ions in the coolant solution to form insoluble lead precipitates. An effective amount can be as low as 0.01 weight percent of $KH_2PO_4$. In general, an effective amount is about 10–20% excess over the stoichiometric amount required to form insoluble lead precipitates. The term "precipitate a substantial amount of soluble lead" means that enough of the dissolved or soluble lead ions form insoluble precipitates so that the coolant solution can be recycled for further use as a machining coolant solution. Generally, at least about 25% or more of the dissolved lead ions are removed from the coolant solution as insoluble precipitates; and preferably, 50% or more of the dissolved lead ions are removed; and most preferably, 90% or more of the dissolved lead ions are removed as insoluble precipitates.

As used herein, the term "lead particulates" includes any solid material containing lead, such as lead fines, lead alloy pieces from grinding, lead salts formed in solution, and lead precipitates.

Advantages of the present invention are that the life of the coolant solution can be significantly prolonged by continually withdrawing a portion of the coolant solution to remove the lead and oil contaminants and recycling the treated coolant back to the machining coolant tank. Another advantage of the invention is that the properties of the coolant solution remain unaltered subsequent to the removal of the insoluble lead particulates, the lead precipitates, and the oil. Additional benefits of coolant recycling are: the reduction of the purchase of coolant; reduction of health risks to operators; reduction of the cost for disposal of hazardous wastes; reduction of the labor associated with coolant make-up and discharges; and reduction of the liability associated with accidental releases of lead containing coolant.

BRIEF DESCRIPTION OF THE DRAWING

FIG. 1 is a schematic diagram of the process for recycling machining coolant solutions to remove lead and oil.

STATEMENT OF THE INVENTION

When lead-containing alloys are machined, at least part of the lead metal in the alloy is converted to lead ions in the machining coolant solution. Also, during the machining operation, flakes of lead alloy or lead alloy fines enter the coolant solution as lead particulates. If the coolant solution is not treated over a period of time, the lead ions and lead particulates in solution accumulate and lower the effective cooling ability of the solution. Also, at the time of the coolant's waste disposal, the lead may pose environmental concerns. Thus, the lead concentration in the coolant needs to be as low as practical, while still maintaining the properties of the coolant solution. Basically, lead, as particulates and soluble ions, and free oils and grease are present in the coolant solutions used for machining lead containing alloys. This invention treats the solution continuously to remove a major portion of the lead and oils and to save dissolved coolant chemicals. The treatment reduces the concentration of lead in the coolant. Repeated reuse and re-treatment of the solution maintains the concentrations of lead and oils low so that the coolant is less hazardous and is reusable.

A typical coolant solution may contain synthetic oil mixed with water. Examples would be about five weight percent oil and the balance water, or about 0.1 to 10.0 weight percent oil, balance water. The machined parts often are coated with oils as lubricants. These oils enter the coolant solution and form grease/oil layer that can be removed by the method of this invention.

If the lead is present in the form of soluble or dissolved lead compounds, the dissolved lead is converted to particulate by adding a salt such as monobasic potassium phosphate ($KH_2PO_4$). Any salt may be used that forms insoluble lead precipitates and that does not interfere with the chemistry of the coolant solution. Monobasic potassium phosphate ($KH_2PO_4$) will cause the formation of lead phosphates which is one of the least soluble forms of lead. The solubility of lead phosphate at 20° C. is 0.000014 g/100 cc of water. Generally, about two times the stoichiometric amount of $KH_2PO_4$ required to precipitate the soluble lead ions is recommended. At least about 0.0001 weight percent monobasic potassium phosphate may be used. The lead may be present in amounts of about 0.05 to 10,000 ppm (parts per million). It is desirable to reduce the lead to below about 5 ppm, which the method of this invention achieves. The lead precipitates are then removed along with lead particulates and oils and grease by the use of an inorganic hydrophilic membrane. The treated clean coolant is recycled back to the machining coolant tank.

The inorganic hydrophilic membrane may be a ceramic membrane. Examples of suitable membranes are metal oxides, such as alumina ($Al_2O_3$), silica ($SiO_2$), zirconia ($ZrO_2$), titanium oxide ($TiO_2$), and stainless steel. The pore size of the membrane may vary from about 0.01 to 5.0 microns. The pore size is selected based on the amount and size of the lead particulates. The preferred property of the pores of the microfilter is hydrophilic to reject oil as well as suspended solids. The pressure applied to the membrane is calculated by using known chemical engineering principles, but may be about 10 to 200 psi (pounds per square inch).

The operating temperature of the coolant may be between about 10° to 75° C. The chemical treatment and membrane separation may also be conducted at the operating temperature of the coolant, although room temperature is preferred.

To further demonstrate the invention, now turning to FIG. 1, there is shown one contemplated embodiment of the invention for a machining coolant solution tank 1 that has the machining coolant solution 2 containing soluble lead ions, lead particulates, and excess oil and grease. A portion of the coolant solution 2 is pumped 3 into a holding tank 4 to be treated with monobasic potassium phosphate 5 or other appropriate chemical to precipitate the soluble lead ions in the coolant solution. The portion of the coolant solution that is chemically treated with monobasic potassium phosphate while being sufficiently agitated is then passed through an inorganic hydrophilic membrane 6 where the lead particulates, lead precipitates and oil and grease 7 are separated from the coolant. The treated coolant 8 is then recycled via a holding tank 9 back to the machining coolant solution tank 1.

The following examples also demonstrate the invention.

EXAMPLE 1

Removal of Dissolved Lead From Coolant

Two experiments were performed using the 500Å ceramic membrane to treat machining coolant contaminated with lead in the concentration from about 103 to 107 parts per billion (ppb) and about 2198 ppb of oil and grease. The first experiment was performed with no additive and the second run was performed using 0.01 weight % of monobasic potassium phosphate $KH_2PO_4$ with respect to the coolant. White precipitates were formed after the addition of monobasic potassium phosphate. When the liquid was analyzed without the white powder, the lead concentration was below 4 ppb.

Table 1 illustrates the lead concentration in both the feed (original coolant solution before treatment) and the permeate (coolant solution after treatment) with and without the additive. It shows that when the additive was used, the coolant contained less than 4 ppb of lead.

TABLE 1

| Lead Concentration in the Feed: | 103 ppb |
|---|---|
| Permeate without $KH_2PO_4$: | 10 ppb |
| Permeate After $KH_2PO_4$ Addition: | <4 ppb |

EXAMPLE 2

Removal of Supended Lead Particulate

These experiments were performed using 200Å, 500Å, and 2000Å ceramic membranes and the coolant contained high concentrations of lead. The aim of these experiments was to examine the effect of chemical addition and the pore size of the membrane on the removal of lead and oil & grease. Membrane flux was measured for each experiment.

TABLE 2

| | Removal of Lead and Oil & Grease | | | | |
|---|---|---|---|---|---|
| | #1 | #2 | #3 | #4 | #5 |
| $KH_2PO_4$ Used (Wt %) | 0.01 | None | 0.01 | None | 0.10 |
| Filter Pore Size (Å) | 200 | 500 | 500 | 2000 | 2000 |
| Coolant Feed | | | | | |
| Lead (ppm) | 15.9 | 14.0 | 11.5 | 53.0 | 59.0 |
| Oil & Grease (ppm) | 3.5 | 3.5 | 4.6 | 4.0 | 4.0 |
| Treated Coolant (Permeate) | | | | | |
| Lead (ppm) | 0.03 | 2.3 | 1.1 | 4.0 | 4.0 |
| Oil & Grease (ppm) | 0.23 | 1.0 | 1.7 | 2.1 | 2.1 |

TABLE 2-continued

| Removal of Lead and Oil & Grease | | | | | |
| --- | --- | --- | --- | --- | --- |
|  | #1 | #2 | #3 | #4 | #5 |
| Flow Rate (cc/min) | 22.0 | 58.0 | 60.0 | 88.0 | 88.0 |

The three different pore sizes of the ceramic membranes (200Å, 500Å, and 2000Å) produced coolant with acceptable lead concentration (below 5 ppm) regardless of oil & grease concentration. These results were obtained even with relatively large pore sizes (2 microns) and when no additive was used. Significant removal of oil & grease was observed. The treated coolant (permeate) flow rate increased as the ceramic membrane pore size increased. The largest flow rate was obtained with the largest pore size. The results indicate that the majority of lead is present in the form of lead particulate and it can be removed with ceramic membranes with pore size from about 200Å to 2000Å.

EXAMPLE 3

Lead Removal with Polymeric Membrane

These experiments were performed using a polymeric membrane for high concentration of lead in the coolant. All runs were performed at 20 psi pressure. Table 3 illustrates the concentration of lead in both the permeate (treated coolant) and the feed (untreated coolant) for all runs. The amount of lead in the permeate depended on the initial concentration of lead in the feed. In other words, more lead was filtered through the polymer membrane, as the feed-lead concentration increased. The lead removal was not effective for the polymer membrane. The poor removal results were obtained even after addition of monobasic potassium phosphate. The high flow rate of the permeate was due to the high surface area of the membrane. The surface area of this membrane is almost 10 times as much as that of the ceramic membrane.

TABLE 3

| Summary of Polymeric Membrane Experiments | | | | | | |
| --- | --- | --- | --- | --- | --- | --- |
|  | #1 | #2 | #3 | #4 | #5 | #6 |
| $KH_2PO_4$ Used (Wt %) | None | 0.01 | 0.01 | 0.23 | None | 0.01 |
| Coolant Feed | | | | | | |
| Lead (ppm) | 12.3 | 11.3 | 7.6 | 6.6 | 59.0 | 59.0 |
| Oil & Grease (ppm) | 3.5 | 3.5 | 3.9 | 3.9 | 4.0 | 4.0 |
| Treated Coolant (Permeate) | | | | | | |
| Lead (ppm) | 3.0 | 3.2 | 3.7 | 5.8 | 28.0 | 19.0 |

TABLE 3-continued

| Summary of Polymeric Membrane Experiments | | | | | | |
| --- | --- | --- | --- | --- | --- | --- |
|  | #1 | #2 | #3 | #4 | #5 | #6 |
| Oil & Grease (%) | 0.23 | 1.0 | 3.5 | 3.5 | 3.6 | 3.6 |
| Flow Rate (cc/min) | 111 | 120 | 128 | 131 | 135 | 135 |

The results obtained using the ceramic membranes were much better than the results obtained using the polymeric membrane. The treated coolant (permeate) in the case of the ceramic membranes contained lead concentration below 5 ppm regardless of the untreated coolant (feed) initial concentration of lead.

What is claimed is:

1. A method for continuous recycling of a machining coolant solution contaminated with soluble lead, lead particulates, and oil comprising the steps of:

removing a portion of the machining coolant solution from a machining coolant tank;

forming an admixture of an effective amount of monobasic potassium phosphate with the portion of the machining coolant to precipitate a substantial amount of soluble lead from the coolant;

passing the admixture through an inorganic hydrophilic membrane to remove lead precipitates, lead particulates and oil; and then recycling the treated coolant back to the machining coolant tank.

2. A method according to claim 1 where the effective amount of monobasic potassium phosphate is an excess of two times the stoichiometric amount of soluble lead ions present in the portion of the coolant solution being treated.

3. A method according to claim 2 where the amount is at least about 0.0001 weight percent monobasic potassium phosphate.

4. A method according to claim 1 where the inorganic hydrophilic membrane is a ceramic metal oxide or stainless steel.

5. A method according to claim 4 where the ceramic metal oxide is selected from the group consisting of titanium oxide, aluminum oxide, silicon oxide and zirconium oxide.

6. A method according to claim 1 where a pore size of the membrane is about 0.01 to 5.0 microns.

7. A method according to claim 1 where the temperature of the method is from about 10° to 75° C.

8. A method according to claim 1 where the treated coolant contains less than 5 parts per million lead.

\* \* \* \* \*